United States Patent [19]

Rosaen

[11] 4,063,455
[45] Dec. 20, 1977

[54] FLOW METER

[75] Inventor: Nils O. Rosaen, West Bloomfield, Mich.

[73] Assignee: Nancy Helen Rosaen, Ann Arbor, Mich. ; a part interest

[21] Appl. No.: 698,263

[22] Filed: June 21, 1976

[51] Int. Cl.² ............................................. G01F 1/28
[52] U.S. Cl. ...................................................... 73/228
[58] Field of Search ........................................ 73/228

[56] References Cited

U.S. PATENT DOCUMENTS

| | | | |
|---|---|---|---|
| 3,282,102 | 11/1966 | Rosaen | 73/228 |
| 3,776,037 | 12/1973 | Rosaen | 73/228 |
| 3,910,114 | 10/1975 | Rosaen | 73/228 |

Primary Examiner—Richard C. Queisser
Assistant Examiner—Anthony V. Ciarlante
Attorney, Agent, or Firm—Gifford, Chandler, Sheridan & Sprinkle

[57] ABSTRACT

A positive displacement flow meter is provided and comprises a housing having an inlet and an outlet. A vane is secured to a rotatably mounted shaft extending through the housing and resilient means attached to the shaft urge the vane to a closed position whereby fluid communication is closed between the inlet and the outlet in the housing. An indicator is secured to one axial end of the shaft and provides a visual indication of the fluid flow rate through the fluid flow meter. The other axial end of the shaft is accessible exteriorly of the housing and is adapted for attachment to a tool for manually rotating the shaft.

11 Claims, 5 Drawing Figures

FLOW METER

BACKGROUND OF THE INVENTION

I. Field of the Invention

The present invention relates to fluid systems and, more particularly, to a positive displacement flow meter with means for indicating the rate of fluid flow through the system and which is particularly designed for fluids with a high solid content.

II. Description of the Prior Art

Previously known flow meters, such as that described in my previous U.S. Pat. No. 3,282,102, issued on Nov. 1, 1966, have enjoyed wide spread acceptance throughout the trade and have proven commercially successful. This type of flow meter generally comprises a vane mounted on a rotatable shaft which divides the flow meter inlet and outlet into two fluid chambers when there is no fluid flow through the flow meter. As fluids begin to flow through the flow meter, the vane rotates with the shaft and permits fluid communication between the flow meter inlet and the outlet. The rotational position of the vane is proportional to the fluid flow rate through the flow meter so that a pointer attached to one end of the shaft provides a visual indication of the flow rate exteriorly of the flow meter.

One limitation suffered by these previously known flow meters is that these flow meters tended to clog and malfunction when used with fluids with high solid content, commonly known as slurries. In particular the solid content of such slurries tended to accumulate between the flow meter shaft and the flow meter housing and thus impose an additional and unpredictable frictional load upon the flow meter shaft. This additional frictional load resulted in erractic flow meter readings which required disassembly of the flow meter for its repair and cleaning.

SUMMARY OF THE PRESENT INVENTION

The present invention overcomes the above mentioned disadvantages of the previously known flow meters by providing a flow meter particularly adapted for use with fluids with high solid content.

In brief, the flow meter of the present invention comprises a housing having an inlet and an outlet. A vane is mounted on a shaft which is rotatably mounted within the housing. Resilient means urge the vane in one rotational direction such that the vane divides the flow meter inlet and outlet into two fluid chambers when there is no fluid flow through the meter. Indicating means secured to one axial end of the shaft give a visual indication of the rotational position of the vane and, hence, the fluid flow rate through the flow meter in the well known manner.

An elongated shoe, preferably constructed of teflon, is provided between the housing and longitudinally along the shaft. The shoe provides a near frictionless sealing engagement between the shaft with the housing. In the event, however, that solids from the slurry become entrapped or accumulate between the shoe and the shaft, the end of the shaft opposite from the indicating means is accessible externally of the housing. A tool is selectively attachable to the externally accessible end of the shaft so that the shaft may be manually rotated by the tool. The solid deposits between the shaft and the sleeve are shaken loose by the manual rotation of the shaft thus restoring the flow meter to full operating condition.

The accessible end of the flow meter shaft also provides a means for measuring the torque on the flow meter shaft when desired.

A still further feature of the flow meter of the present invention is that all working components of the flow meter are removable from the flow meter housing without removal of the housing from the fluid system to which the flow meter is attached. An annular ring then placed within the housing instead of the working components of the flow meter permits continued fluid flow through the flow system until repair and/or replacement of the working components of the flow meter may be effected.

BRIEF DESCRIPTION OF THE DRAWINGS

The flow meter of the present invention will be more fully understood by reference to the following detailed description when read in conjunction with the accompanying drawings, wherein like reference characters refer to like parts throughout the several views, and in which:

FIG. 3 is a cross sectional view showing the flow meter of the present invention and taken substantially along line 3—3 in FIG. 2;

FIG. 4 is a cross sectional view taken substantially along line 4—4 in FIG. 2 and with parts removed for clarity; and FIG. 5 is a view similar to FIG. 3 but showing parts removed for purpose of repair.

DETAILED DESCRIPTION OF THE PRESENT INVENTION

Figure 1:
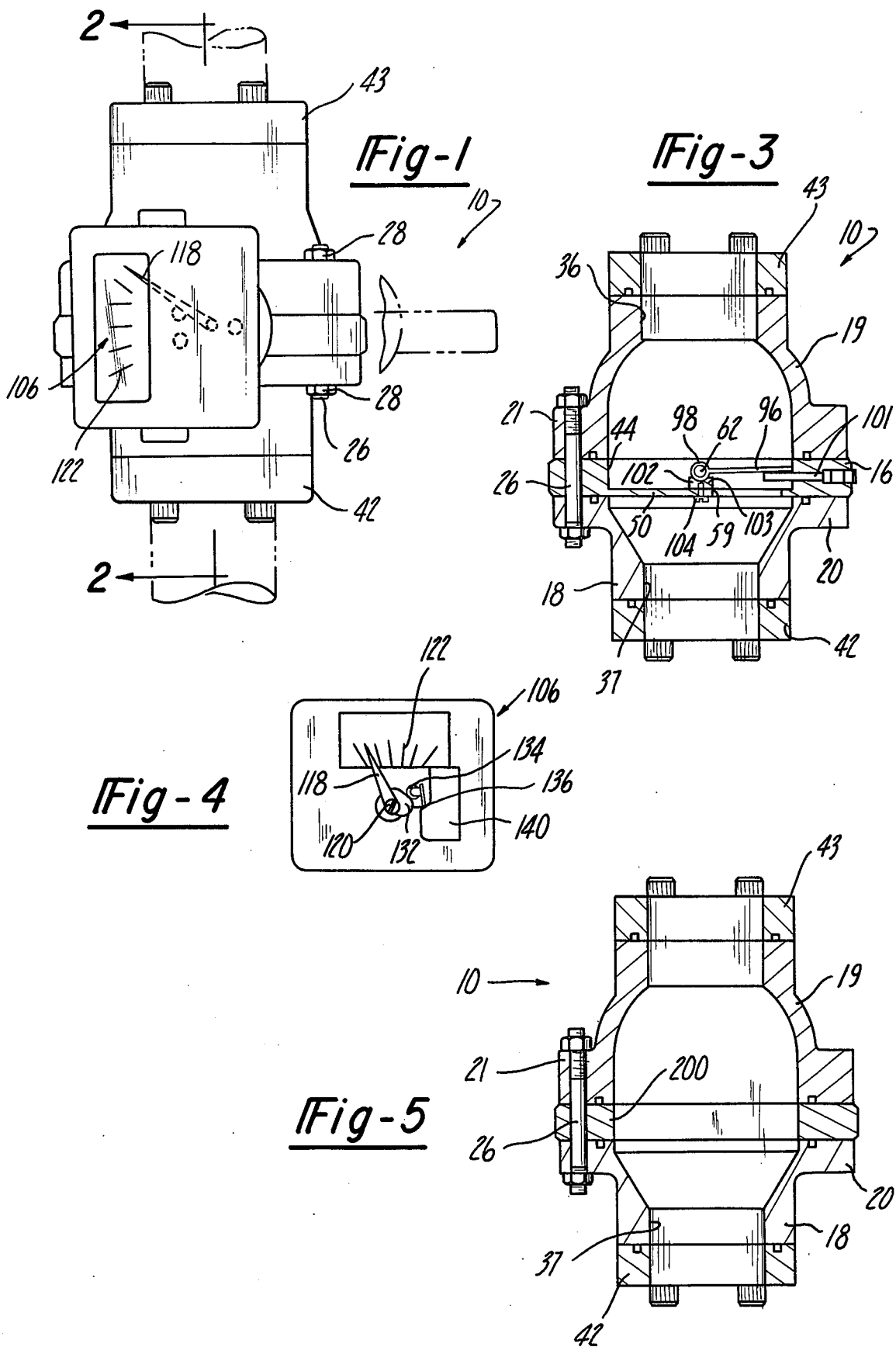
FIG. 1 is a side plan view showing the flow meter of the present invention.
Figure 2:
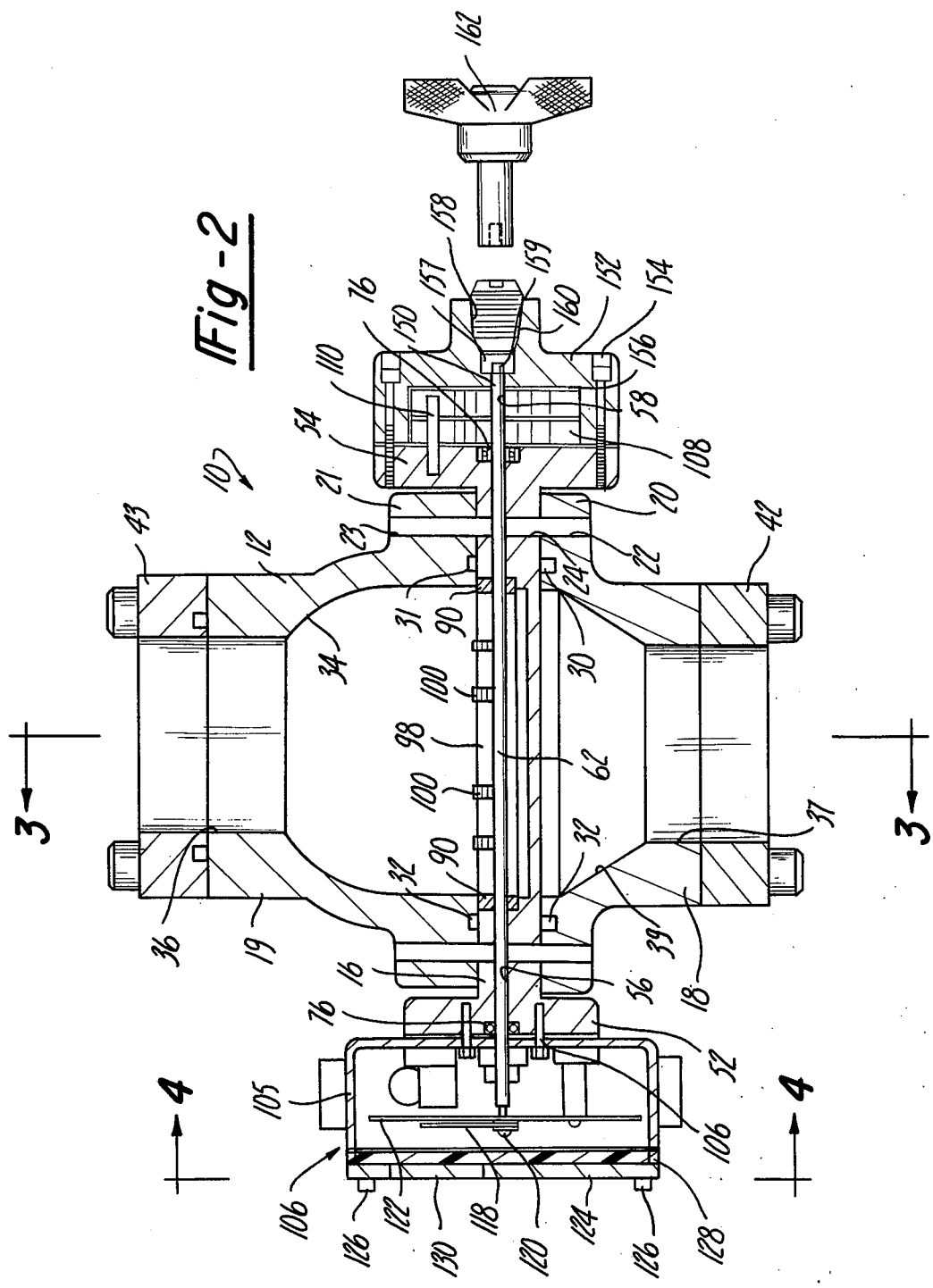
FIG. 2 is a cross sectional view showing the flow meter of the present invention and taken substantially along line 2—2 in FIG. 1.

Referring particularly to FIGS. 1–3, the flow meter 10 of the present invention is thereshown as comprising a housing 12. The housing 12 generally comprises a central cylindrical section 16, an inlet end section 18 and an outlet end section 19. Each end section 18 and 19 includes an annular flange 20 and 21 having a number of axial bores 22 and 23 therethrough. The bores 22 and 23 register with each other and with axial bores 24 formed through the central housing section 16 so that a corresponding number of studs 26 may be inserted through the three registering bores 22, 23 and 24 in the two end sections 18 and 19 and the central section 16. Nuts 28 are then threaded onto the studs 26 and tightened to secure the end sections 18 and 19 to the central housing section 16. Preferably, the end sections 18 and 19 each include an annular groove 30 and 31, respectively, on each end adjacent the flanges 20 and 21. Each groove 30 and 31 is adapted to receive an O-ring 32 therein in order to provide a sealing engagement between the two end sections 18 and 19 and the central housing section 16.

The outlet end section 19 further comprises a hemispherical wall section 34 with a radially disposed bore 36 which forms the outlet port of the flow meter 10. Similarly, the inlet end section 18 includes a bore 37 which forms the inlet port and an outwardly tapering conical wall portion 39 which faces the hemispherical wall section 34 in the outlet end section 19. Mounting flanges 42 and 43 on the inlet end section 18 and outlet end section 19, respectively, provide a simple attachment to a fluid system (not shown).

The central housing sections 16, in contrast to the end sections 18 and 19, has an axial bore 44 therethrough. A semicircular mounting plate 50 is preferably integral with the central housing section 16 and obstructs one-half of the axial bore 44 for a reason which will become hereinafter apparent.

Referring now to FIG. 2, a first mounting flange 52 and a second mounting flange 54 are integrally formed with the central housing section 16 at diametrically opposed sides of the central bore 44. A first radial bore 56 formed through the housing section 16 and the first flange 52 registers with a like sized bore 58 formed through the central housing seciton 16 and the second mounting flange 54. Each of the bores 56 and 58 are open to the central bore 44 of the central housing section 16 on one end and open externally of the central housing section 16 at their other end. In addition, the bores 56 and 58 are in a spaced and parallel relationship with the inner edge 59 of the mounting plate 50 (shown in FIG. 3).

A shaft 62 is rotatably mounted through the registering bores 56 and 58 so that one end of the shaft 62 extends outwardly from the first mounting flange 52 while the other axial end of the shaft 62 extends outwardly from the second mounting flange 54. The shaft 62 is preferably journalled in ball bearing races 76 recessed within the mounting flanges 52 and 54 and conventional means (not shown) are provided to prevent axial movement of the shaft within the bores 56 and 58. In addition, appropriate sealing means 90 are disposed between the bores 56 and 58 and the shaft 62 to prevent fluid communication outwardly from the axial bore 44 along the shaft 62.

A semicircular vane 96 (FIG. 3) with a cylindrical, tubular sleeve 98 is secured by screws 100 through the sleeve 98 to the shaft 62 within the axial bore 44. As best shown in FIG. 3, a radial pin 101 secured to the central housing section 16 extends inwardly into the axial bore 44 and limits the rotational travel of the vane 96. Furthermore, the radius of the vane 96 is substantially the same as both the axial bore 44 and the hemispherical wall section 34 (FIG. 2). The center of the sphere circumscribed by vane 96 as it rotates is displaced from the center of the hemispherical wall section 16. Thus, as the vane 96 rotates towards the hemispherical wall section 34, the area between the vane 96 and the wall section 34 will gradually increase as will be more fully described hereinafter.

An elongated shoe 102 (FIG. 3), preferably constructed of teflon, is secured to the mounting plate 50 by screws 104. The shoe 102 extends diametrically across the entire axial bore 44 adjacent the inner edge 59 of the mounting plate 50 and includes a curved recess 103 which abuts against and receives the sleeve 98 of the vane 96 therein. The shoe 102 provides a nearly frictionless sealing engagement between the shoe 102 and the vane sleeve 98 thereby prohibiting fluid flow between the mounting plate 50 and the vane sleeve 98.

Referring now particularly to FIGS. 1, 2, and 4, indicating means 106 provide an externally visible indication of the rotational position of the vane 96 and hence of the rate of fluid flow through the flow meter 10. The indicating means 106 are contained within a housing 105 secured to the first mounting flange 52 by any appropriate means such as bolts 106.

A pointer arm 118 is secured by a screw 120 to the left end of the shaft 62 as viewed in FIG. 2 adjacent an indicia carrying plate 122. The indicia carrying plate 122 is secured to the housing 105 in any conventional manner such that the plane of the plate 122 is normal to the axis of the shaft 62. Hence, as the shaft 62 rotates, the pointer arm 118 will swing across the face of the plate 122.

If desired, a cam member 132 (FIG. 4) is coaxially secured to and around the shaft 62 within the indicator means housing 105. The cam member 132 cooperates with a switch actuator 134 which rides along the cam surface 136 of the cam member 132. Thus when the cam member 132 reaches a predetermined rotational position as determined by the rotated position of the flow meter shaft 62, the cam member 132 actuates a switch 140 via the switch actuator 134. The switch actuation may be utilized for a variety of purposes. For example actuation of the switch 140 may sound an alarm or activate a mechanism to clean or change a filter. Other uses of the switch actuation are of course, possible and will be obvious to those skilled in the art.

A cover plate 124 (FIG. 2) encloses the open side of the indicator housing 105 and is secured thereto by bolts 126. Preferably an annular seal 128 is provided intermediate the cover plate 124 and the indicator housing 105 to prevent foreign matter from entering the housing 105. The cover plate 124 further includes a window 130 constructed of a transparent material such as glass or plastic, so that the indicia carrying plate may be viewed through the cover plate 124.

With reference now to FIG. 2, at the end of the shaft 62 opposite from the indicator means housing 105, a portion 150 of the shaft 62 extends outwardly from the second mounting flange 54. A low tension coil spring 108 is wound around the protruding portion 150 of the shaft 62. One end of the spring 108 is secured to the shaft portion 150 by any conventional means, such as a slot, and the other end of the spring 108 is secured to the second flange 54 by a pin 110. The spring 108 is preloaded so as to urge the shaft 62 with the attached vane 96 to the position shown in FIG. 3, i.e. with the outer periphery of the vane 96 abutting against the stop pin 101.

A cover 152 is secured to the second mounting flange 54 by any conventional means such as bolts 154, such that the spring 108 is entrapped within a chamber 156 between the cover 152 and the mounting flange 54.

A bore 157 through the cover 150 registers with the shaft 62 and receives a portion 159 of the shaft therein. The bore 157 includes an outer enlarged diameter threaded portion 158 which may be selectively closed by a removable plug 160.

The portion 159 of the shaft 62 is squared off and is adapted for connection to any appropriate tool 162. Thus with the plug 160 removed from the threaded bore 158, the tool may be inserted within the bore 158 and coupled with the shaft 62 so that rotation of the tool 162 manually rotates the shaft 62 with the attached vane 96.

Having described the component parts of my invention the operation of my flow meter is as follows: Referring particularly to FIGS. 2 and 3, the coil spring 108 urges the shaft 62 with the attached vane 96 to the position shown in FIG. 3, i.e. with the vane 96 abutting against the stop pin 101. In this position the vane 96 in combination with the mounting plate 50 acts as a partition and divides the flow meter inlet 37 and outlet 36 into two separate fluid chambers. The shoe 102 which abuts against the vane sleeve 98 effectively prevents fluid flow between the plate 50 and the vane sleeve 98.

In the well known fashion as fluid begins to flow through the flow meter 10, the vane 96 swings toward the outlet 36. Thus movement exposes a curved opening between the outer periphery of the vane 96 and the bore 44 of the central housing section 16 and permits fluid communication between the inlet 37 and the outlet 36. The size of the curved opening increases proportionately with the rotational position of the vane 96 and likewise the rotational position of the vane 96 is dependent upon the fluid flow rate through the flow meter 10. The rotational position of the vane 96 and hence the fluid flow rate through the flow meter 10, is displayed externally of the flow meter 10 by the pointer 118 and the indicia carrying plate 122.

The flow meter 10 of the present invention is particularly adapted for use with fluid having a high solid content, commonly called slurries. The shoe 102 effectively inhibits the accumulation of solids around the vane sleeve 98. However, after prolonged use of the flow meter 10, solids from the fluid accumulate between and around the shoe 102, the vane sleeve 98, and the vane 96. The embedded solids from the fluid impose additional frictional loads upon the vane sleeve 98 which are unpredictable and accordingly result in inaccurate flow meter readings.

In this event the plug 160 is removed from the threaded bore 158 in the cover 152 and the tool 162 is attached to the end portion 159 of the shaft 62. The tool 162 is used to manually rotate the shaft 62 with the attached vane 96 which serves to shake loose the solid deposits from the shoe 102, the vane sleeve 98 and the vane 96 and return them to the fluid flow. When the solid deposits have been freed by the above described procedure, the tool 162 is removed and the plug 160 is replaced within the threaded bore 158. Thereafter accurate flow meter readings are again obtainable.

The accessible end of the shaft 62 is also useful for obtaining torque readings of the shaft 62 when such torque readings are desirable.

A still further feature of the flow meter 10 of the present invention is that all working components of the flow meter 10 are carried by the central housing section 16. Thus when repair of the flow meter 10 is required, removal of the central housing section 16 (as shown in phantom line in FIG. 1) simultaneously removes all working components from the flow meter 10.

Thereafter, as best seen in FIG. 5, a tubular cylindrical ring 200 may be inserted between the end housing sections 18 and 19 so that fluid flow may continue through the flow meter 10 while the flow meter 10 is repaired. After repair of the flow meter 10, the ring 200 is removed and the central housing section 16 is again inserted between the two end sections 18 and 19 and secured thereto by the studs 26 and nuts 28.

It can thus be seen that the flow meter 10 of the present invention provides a novel flow meter which is particularly useful for fluids having a high solid content. The shoe 102 minimizes the accumulation of solid material around and between the vane sleeve 98 and the shoe 102. Moreover even when the solids accumulate, manual rotation of the shaft 62 is usually sufficient to shake loose the deposits from the shoe 102, the vane 98 and the vane sleeve 96.

A still further feature of the present invention is that all working components of the flow meter 10 may be removed from the flow meter and repaired without permanently disrupting the fluid flow through the flow meter.

Having thus described my invention, many modifications thereto will become apparent to those skilled in the art to which it pertains without deviating from the spirit of the invention as defined by the scope of the appended claims.

I claim:

1. A flow meter for a fluid system comprising:
    a housing having an inlet and an outlet adapted to be connected with said system, and a substantially hemispherical interior wall section,
    a rotatably mounted shaft in said housing, said shaft having one axial end accessible exteriorly of said housing,
    means formed on the accessible end of said shaft for detachable axial connection with a tool whereby upon connection of said tool with said end of said shaft, said shaft rotates in unison with said tool, said tool being adapted for manually rotating said shaft,
    a vane secured to said shaft, said vane having substantially semicircular outer edge rotatable adjacent said hemispherical wall section;
    wherein the center of said hemispherical wall section is displaced from the center of the hemisphere circumscribed by the outer edge of the vane whereby the space between the outer edge of said vane and the hemispherical wall section varies at each rotated position of said vane, and
    means for indicating the rotation position of said vane exteriorly of said housing.

2. The invention as defined in claim 1 and including resilient means for urging said shaft in one rotational direction.

3. The invention as defined in claim 2 wherein said resilient means is a coil spring.

4. The invention as defined in claim 1, and in which the radius of said vane is substantially the same as the radius of said hemispherical wall section.

5. The invention as defined in claime 1 and in which said last mentioned means comprises a pointer arm secured onto the end of said shaft and generally normal thereto, and an indicia carrying plate adjacent to the outer end of said pointer arm wherein the plane of said indicia carrying plate is substantially normal to the axis of said last mentioned shaft.

6. The invention as defined in claim 1 wherein said first mentioned means comprises a portion having a square cross-sectional shape at the accessible end of said shaft.

7. The invention as defined in claim 1 and including a cover plate enclosing said accessible end of said shaft, said cover plate having an aperture formed therethrough coaxial with said shaft, and a removable plug for closing said aperture.

8. The invention as defined in claim 7 wherein said cover plate and said indicating means are disposed on opposite axial ends of said shaft.

9. The invention as defined in claim 1 and including a substantially semi-circular mounting plate secured to said housing so that the diametrical edge of said mounting plate is substantially parallel to and spaced from said shaft, and an elongated shoe secured to said mounting plate and sealingly engaging said shaft.

10. The invention as defined in claim 9 wherein said shoe is constructed of teflon.

11. The invention as defined in claim 1 wherein said housing comprises a removable central housing section sandwiched between an inlet end section and an outlet end section, wherein said shaft is rotatably carried by said central housing section whereby all moving components of said flow meter are removable from said flow meter upon the removal of said central housing section from said housing.

* * * * *

UNITED STATES PATENT AND TRADEMARK OFFICE
CERTIFICATE OF CORRECTION

PATENT NO. : 4,063,455
DATED : December 20, 1977
INVENTOR(S) : Nils O. Rosaen

It is certified that error appears in the above-identified patent and that said Letters Patent are hereby corrected as shown below:

Col. 1, line 35, delete "erractic", insert --erratic--.

Col. 3, line 13, delete "seciton", insert --section--.

Signed and Sealed this

Fourth Day of April 1978

[SEAL]

Attest:

RUTH C. MASON
Attesting Officer

LUTRELLE F. PARKER
Acting Commissioner of Patents and Trademarks